United States Patent
Carlson et al.

(10) Patent No.: US 11,185,932 B2
(45) Date of Patent: Nov. 30, 2021

(54) ROTARY POWER TOOL

(71) Applicant: MILWAUKEE ELECTRIC TOOL CORPORATION, Brookfield, WI (US)

(72) Inventors: Mitchell Carlson, Lisbon, WI (US); Terry L. Timmons, Oconomowoc, WI (US); Paul W. Eiche, Oconomowoc, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/710,154

(22) Filed: Dec. 11, 2019

(65) Prior Publication Data

US 2020/0108453 A1 Apr. 9, 2020

Related U.S. Application Data

(63) Continuation of application No. 16/050,044, filed on Jul. 31, 2018.

(Continued)

(51) Int. Cl.
*B23B 45/00* (2006.01)
*B25F 5/02* (2006.01)
(Continued)

(52) U.S. Cl.
CPC .............. *B23B 45/00* (2013.01); *B25F 5/026* (2013.01); *B23B 45/001* (2013.01);
(Continued)

(58) Field of Classification Search
CPC ..... B23B 45/00; B23B 45/001; B23B 45/003; B23B 45/006; B23B 45/008; B23B 45/02;
(Continued)

(56) References Cited

U.S. PATENT DOCUMENTS

| 1,539,068 | A | | 5/1925 | Brockett | |
|---|---|---|---|---|---|
| 2,545,659 | A | * | 3/1951 | Ginter | B23B 45/001 16/426 |

(Continued)

FOREIGN PATENT DOCUMENTS

| CN | 103956441 A | 7/2014 |
|---|---|---|
| CN | 204711263 U | 10/2015 |

(Continued)

OTHER PUBLICATIONS

International Search Report and Written Opinion for Application No. PCT/US2018/04490 dated Nov. 14, 2018 (16 pages).

(Continued)

*Primary Examiner* — Eric A. Gates
(74) *Attorney, Agent, or Firm* — Michael Best & Friedrich LLP

(57) ABSTRACT

A power tool includes a housing, a motor, a spindle, a handle holder and an auxiliary handle. The housing includes a motor housing portion, a drive housing, and a mounting portion between the motor housing portion and the drive housing. The motor is located within the motor housing portion. The spindle is configured to rotate about a rotational axis in response to torque received from the motor. The handle holder is coupled to the drive housing and defines a first mounting point, and the mounting portion defines a second mounting point. The auxiliary handle is selectively attachable to each of the first and second mounting points, and the first mounting point is located at a first position along the rotational axis, and the second mounting point is located at a second position offset from the first position in a direction along the rotational axis.

20 Claims, 14 Drawing Sheets

Related U.S. Application Data

(60) Provisional application No. 62/538,884, filed on Jul. 31, 2017.

(51) Int. Cl.
*B23B 51/04* (2006.01)
*B23B 45/02* (2006.01)
*B23Q 11/10* (2006.01)

(52) U.S. Cl.
CPC ........... *B23B 45/008* (2013.01); *B23B 45/02* (2013.01); *B23B 51/0486* (2013.01); *B23B 2250/12* (2013.01); *B23B 2260/024* (2013.01); *B23Q 11/1015* (2013.01); *B23Q 11/1023* (2013.01); *Y10T 408/44* (2015.01); *Y10T 408/455* (2015.01); *Y10T 408/91* (2015.01)

(58) Field of Classification Search
CPC ... B23B 2260/024; Y10T 408/91; B25F 5/026
See application file for complete search history.

(56) References Cited

U.S. PATENT DOCUMENTS

| | | | |
|---|---|---|---|
| 2,976,436 A * | 3/1961 | Anton | B23B 45/008 173/50 |
| 3,148,568 A * | 9/1964 | Hoza | B25F 5/026 81/177.1 |
| 3,537,336 A * | 11/1970 | Schmuck | B23B 49/006 408/72 R |
| 3,547,350 A | 12/1970 | Marcoux | |
| 3,583,383 A | 6/1971 | Ovshinsky | |
| 3,741,317 A | 1/1973 | Unterschweiger et al. | |
| 4,209,069 A | 6/1980 | Smith | |
| 4,365,418 A | 12/1982 | Hoyss et al. | |
| 4,365,962 A | 12/1982 | Regelsberger | |
| 4,380,991 A | 4/1983 | Richter et al. | |
| 4,437,526 A | 3/1984 | Gloor | |
| 4,503,425 A * | 3/1985 | Gerber | B23B 45/001 340/521 |
| 4,684,303 A | 8/1987 | Erdt et al. | |
| 4,730,134 A | 3/1988 | Sistare | |
| 4,820,090 A * | 4/1989 | Chen | B25F 5/027 16/431 |
| 5,049,012 A * | 9/1991 | Cavedo | B25F 5/026 408/241 R |
| 5,076,482 A | 12/1991 | Kozyrski et al. | |
| 5,377,769 A | 1/1995 | Hasuo et al. | |
| 5,733,074 A | 3/1998 | Stöck et al. | |
| 5,951,217 A | 9/1999 | Ostermeier et al. | |
| 5,980,168 A | 11/1999 | Tsypin et al. | |
| 5,996,708 A | 12/1999 | Gerold | |
| 6,092,965 A | 7/2000 | Mark et al. | |
| 6,113,320 A | 9/2000 | Ostermeier et al. | |
| 6,138,772 A | 10/2000 | Miescher et al. | |
| 6,176,655 B1 | 1/2001 | Ostermeier et al. | |
| 6,223,835 B1 | 5/2001 | Habedank et al. | |
| 6,241,594 B1 * | 6/2001 | Lepold | B24B 23/005 451/357 |
| 6,412,572 B2 | 7/2002 | Habedank et al. | |
| 6,478,095 B2 | 11/2002 | Neumaier | |
| 6,595,300 B2 * | 7/2003 | Milbourne | B25B 21/00 16/431 |
| 6,609,860 B2 * | 8/2003 | Wanek | B25F 5/026 408/14 |
| 6,612,588 B2 | 9/2003 | Ostermeier et al. | |
| 6,640,914 B2 | 11/2003 | Wisser et al. | |
| 6,681,869 B2 | 1/2004 | Würsch et al. | |
| 6,712,162 B2 | 3/2004 | Britz | |
| 6,712,163 B2 | 3/2004 | Kleine et al. | |
| 6,729,415 B1 | 5/2004 | Huang | |
| 6,731,047 B2 | 5/2004 | Kauf et al. | |
| 6,887,018 B2 | 5/2005 | Ostermeier | |
| 6,898,860 B2 | 5/2005 | Wu | |
| 6,932,546 B2 | 8/2005 | Ohlendorf | |
| 7,055,624 B2 | 6/2006 | Reitberger | |
| 7,070,366 B2 | 7/2006 | Reichenberger et al. | |
| 7,073,797 B2 | 7/2006 | Gaul | |
| 7,210,878 B2 | 5/2007 | Koslowski et al. | |
| 7,219,753 B2 | 5/2007 | Gaul | |
| 7,243,734 B2 | 7/2007 | Wu | |
| 7,306,049 B2 | 12/2007 | Soika et al. | |
| D559,059 S | 1/2008 | Concari | |
| 7,331,408 B2 | 2/2008 | Arich et al. | |
| 7,497,277 B2 | 3/2009 | Sander et al. | |
| 7,705,497 B2 | 4/2010 | Arich et al. | |
| 7,721,825 B2 | 5/2010 | Gobright, IV et al. | |
| 7,824,247 B1 | 11/2010 | Bar-Cohen et al. | |
| 7,980,793 B2 | 7/2011 | Mathis | |
| 8,122,972 B2 | 2/2012 | Soika et al. | |
| 8,132,296 B2 | 3/2012 | Di Nicolantonio | |
| 8,146,681 B2 | 4/2012 | Heemann et al. | |
| 8,286,725 B2 | 10/2012 | Arich | |
| 8,430,182 B2 | 4/2013 | Soika et al. | |
| 8,636,084 B2 | 1/2014 | Ohlendorf | |
| 8,800,412 B2 | 8/2014 | Griffin | |
| 8,888,417 B2 | 11/2014 | Jonsson et al. | |
| 8,946,949 B2 | 2/2015 | Schittl | |
| 10,710,172 B2 * | 7/2020 | Carlson | B23B 51/0486 |
| 2001/0052429 A1 | 12/2001 | Frenzel et al. | |
| 2004/0163214 A1 | 8/2004 | Cheng | |
| 2006/0091858 A1 | 5/2006 | Johnson et al. | |
| 2008/0087333 A1 | 4/2008 | Pfeiffer et al. | |
| 2010/0005629 A1 * | 1/2010 | Di Nicolantonio | B25F 5/026 16/426 |
| 2011/0088922 A1 | 4/2011 | Hirayama et al. | |
| 2011/0186503 A1 | 8/2011 | Holzmeier et al. | |
| 2011/0215539 A1 | 9/2011 | Van Der Linde et al. | |
| 2012/0234570 A1 | 9/2012 | Machida et al. | |
| 2012/0243953 A1 | 9/2012 | Orberndorfer | |
| 2013/0068529 A1 | 3/2013 | Hofbrucker et al. | |
| 2013/0089382 A1 * | 4/2013 | Baditoi | B23Q 11/1076 408/56 |
| 2013/0195570 A1 * | 8/2013 | Nordgren | B28D 1/14 408/56 |
| 2013/0206441 A1 | 8/2013 | Roser et al. | |
| 2013/0213683 A1 | 8/2013 | Brewster et al. | |
| 2015/0104264 A1 | 4/2015 | Vogel et al. | |
| 2015/0122063 A1 | 5/2015 | Elger | |
| 2015/0144366 A1 | 5/2015 | Machida | |
| 2016/0031119 A1 | 2/2016 | Taack-Trakranen | |
| 2016/0036089 A1 | 2/2016 | Lutz et al. | |
| 2016/0151934 A1 | 6/2016 | Pfeifer et al. | |
| 2016/0200600 A1 | 7/2016 | Koslowski et al. | |
| 2017/0100831 A1 | 4/2017 | Schreiber et al. | |
| 2017/0106520 A1 | 4/2017 | Schadow et al. | |
| 2017/0274487 A1 | 9/2017 | Sattler | |
| 2018/0366697 A1 | 12/2018 | Elfering et al. | |
| 2018/0376625 A1 | 12/2018 | Truettner et al. | |
| 2019/0006980 A1 | 1/2019 | Sheeks et al. | |

FOREIGN PATENT DOCUMENTS

| | | | |
|---|---|---|---|
| EP | 0598218 | A1 | 5/1994 |
| EP | 2181786 | A1 | 5/2010 |
| EP | 2253430 | A1 | 11/2010 |
| GB | 2411148 | A | 8/2005 |
| JP | 2000000784 | A | 1/2000 |
| JP | 2001088059 | A | 4/2001 |
| WO | 2003053616 | A1 | 7/2003 |
| WO | 2005102626 | A2 | 11/2005 |
| WO | 2008026987 | A1 | 3/2008 |
| WO | 2013064321 | A1 | 5/2013 |
| WO | 2013187837 | A2 | 12/2013 |
| WO | 2016196969 | A1 | 12/2016 |

OTHER PUBLICATIONS

Patent Cooperation Treaty, Third Party Observation for Application No. PCT/US2018/044490, submitted on Oct. 23, 2019 (11 pages).

(56) References Cited

OTHER PUBLICATIONS

Extended European Search Report for Application No. 18841616.5 dated Apr. 19, 2021 (10 pages).

* cited by examiner

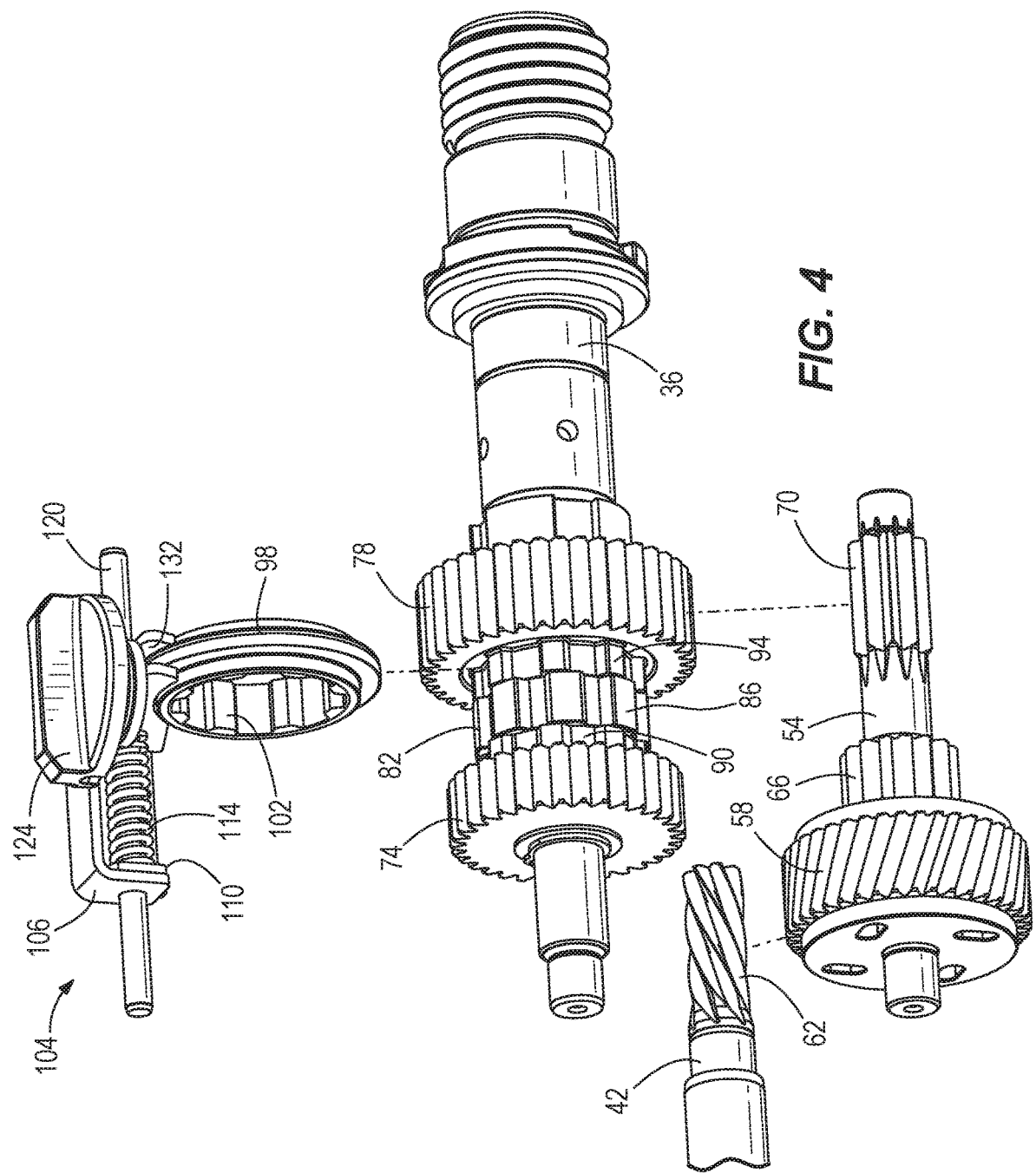

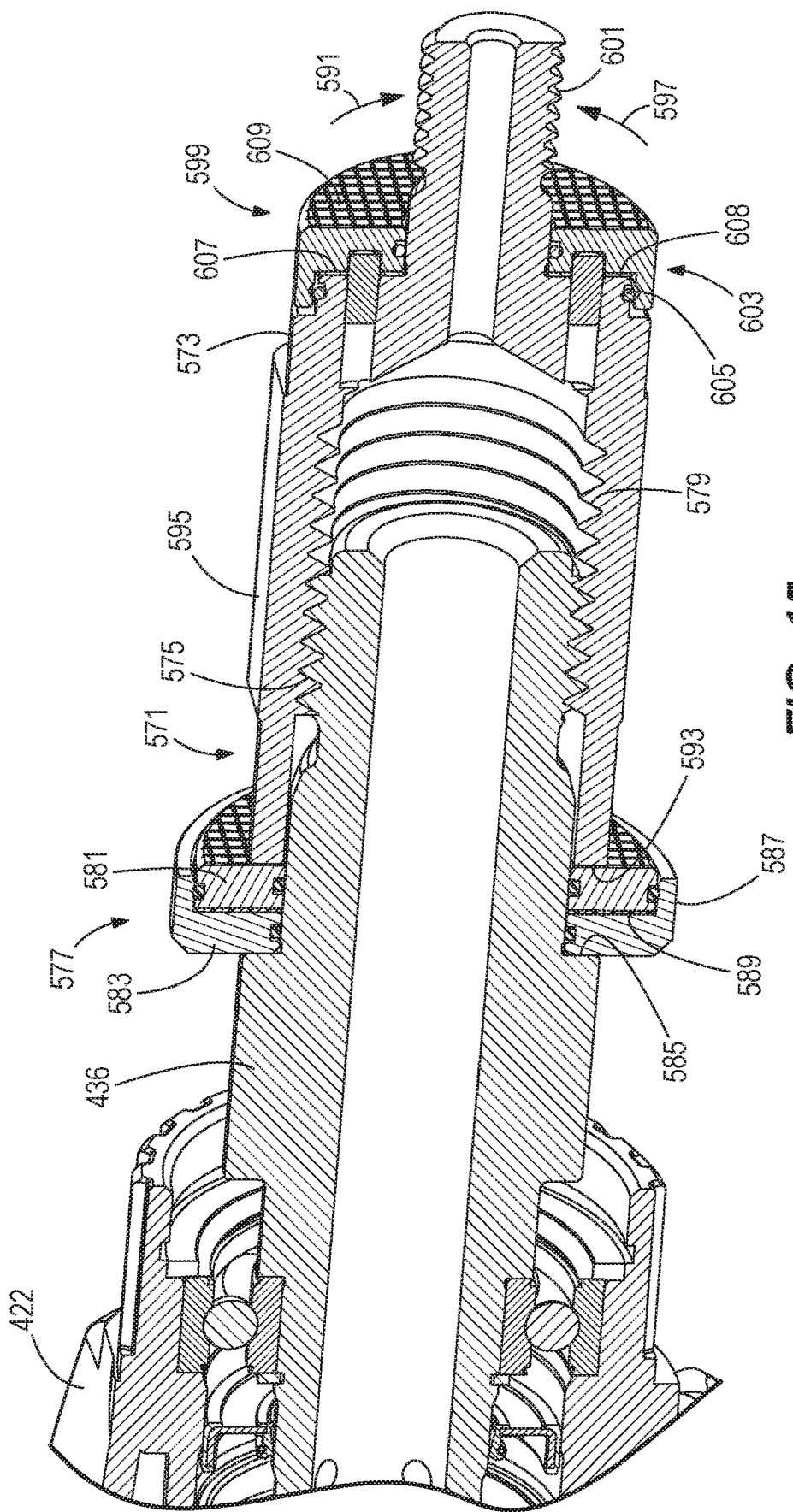

ROTARY POWER TOOL

CROSS-REFERENCE TO RELATED APPLICATIONS

This application is a continuation of U.S. patent application Ser. No. 16/050,044, filed Jul. 31, 2018, now U.S. Pat. No. 10,710,172, which claims priority to U.S. Provisional Patent Application No. 62/538,884, filed on Jul. 31, 2017, the entire content of which are incorporated herein by reference.

FIELD OF THE INVENTION

The present invention relates to rotary power tools, and more particularly to core drills.

BACKGROUND OF THE INVENTION

Core drills are typically used to remove a cylinder of material from a workpiece.

SUMMARY OF THE INVENTION

The present invention provides, in one aspect, a rotary power tool including a housing having a motor housing portion, a drive housing, and a mounting portion between the motor housing portion and the drive housing. The rotary power tool further includes a motor located within the motor housing portion, a spindle configured to rotate about a rotational axis in response to torque received from the motor, and a handle holder coupled to the drive housing. The handle holder defines a first mounting point, and the mounting portion defines a second mounting point. An auxiliary handle is selectively attachable to each of the first and second mounting points. The first mounting point is located at a first position along the rotational axis, and the second mounting point is located at a second position offset from the first position in a direction along the rotational axis.

The present invention provides, in another aspect, a power tool including a housing with a motor housing portion, a drive housing, and a mounting portion between the motor housing portion and the drive housing, a motor located within the motor housing portion, a spindle configured to rotate about a rotational axis in response to torque received from the motor, and a transmission at least partially disposed within the drive housing. The transmission is configured to transmit torque from the motor to the spindle. The power tool also includes an auxiliary handle selectively attachable to the housing at each of a first mounting point, a second mounting point, and a third mounting point. At least one of the group consisting of the first mounting point, the second mounting point, and the third mounting point is located on the mounting portion.

The present invention provides, in another aspect, a power tool including a housing having a motor housing portion and a mount, a motor located within the motor housing portion, a spindle configured to rotate about a rotational axis in response to torque received from the motor, and a handle holder selectively securable to the mount in a plurality of different rotational orientations about the rotational axis. The handle holder includes a first mounting point, and the housing includes a second mounting point. The power tool also includes an auxiliary handle selectively attachable to each of the first mounting point and the second mounting point.

Other features and aspects of the invention will become apparent by consideration of the following detailed description and accompanying drawings.

BRIEF DESCRIPTION OF THE DRAWINGS

FIG. 4 is a partially exploded view of the drive assembly of FIG. 3.

FIG. 15 is a cross-sectional view taken along line 15-15 in FIG. 14.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
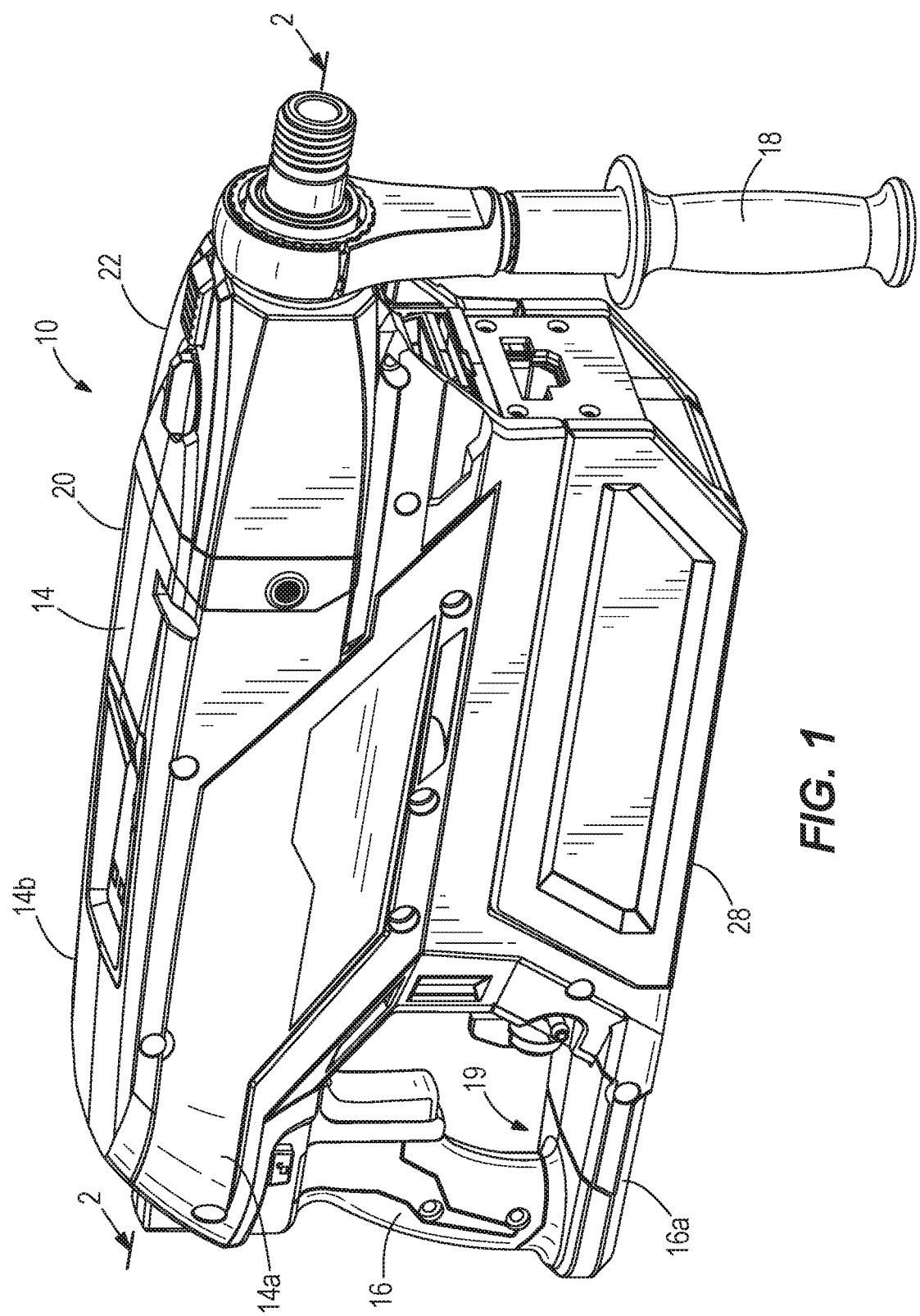
FIG. 1 is a perspective view of a core drill in accordance with an embodiment of the invention.
Figure 2:
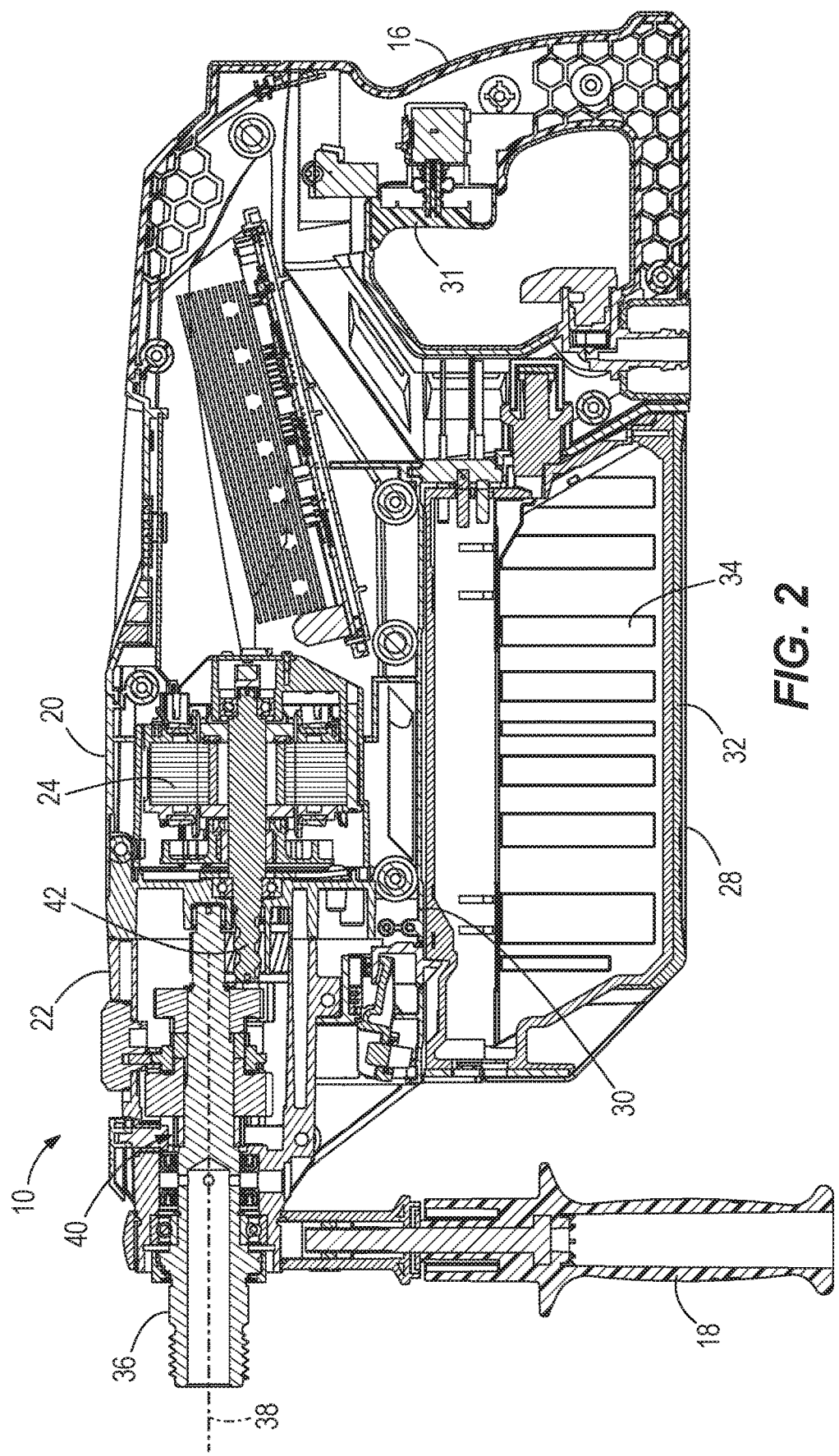
FIG. 2 is a cross-sectional view of the core drill of FIG. 1.

FIGS. 1 and 2 illustrate a rotary power tool, which is a core drill 10 in the illustrated embodiment. The core drill 10 includes a housing 14, a first or rear handle 16, and a second or auxiliary handle 18. A generally D-shaped gap 19 is defined between the rear handle 16 and the housing 14. The gap 19 provides clearance for a user's fingers when the user grasps the rear handle 16. In the illustrated embodiment, the rear handle 16 includes a base portion 16a at its lower end that extends to the housing 14. As such, the gap 19 is an aperture that is fully bounded about its perimeter by the rear handle 16, the base portion 16a, and the housing 14. In other embodiments, the base portion 16a may not connect to the housing 14.

The illustrated housing 14 is a clamshell housing having left and right cooperating halves 14a, 14b and includes a motor housing portion 20 and a drive housing 22 (FIG. 1). An electric motor 24 is mounted in the motor housing portion 20 (FIG. 2). In the illustrated embodiment, the motor 24 is a brushless direct current motor; however, in other embodiments, the core drill 10 may include other types of motors. The illustrated core drill 10 is cordless and includes a battery 28 that provides power to the motor 24. The battery 28 is removably coupled to a battery receptacle 30, which is located underneath the motor housing portion 20 in the illustrated embodiment. In other embodiments, the core drill 10 may be a corded tool configured to receive power from a wall outlet or other remote power source. A trigger 31 is provided on the rear handle 16 and energizes the motor 24 when depressed by a user.

With continued reference to FIG. 2, the battery 28 is a power tool battery pack and includes a battery housing 32 and a plurality of rechargeable battery cells 34 disposed within the housing 32. The battery cells 34 are preferably lithium-based battery cells but can alternatively have any other suitable chemistry. In the illustrated embodiment, the battery 28 has a nominal output voltage of about 80V. In other embodiments, the battery 28 can have a different nominal voltage, such as, for example, 36V, 40V, 72V, between 36V and about 80V, or greater than 40V.

The core drill 10 further includes a spindle 36 rotatable about a rotational axis 38 in response to receiving torque from the motor 24 (FIG. 2). A tool bit (not shown) can be coupled to the spindle 36 for co-rotation with the spindle 36 to perform work (e.g., drilling) on a workpiece. A drive assembly 40 is disposed within the drive housing 22 to transmit torque from an output shaft 42 of the motor 24 to the spindle 36.

Figure 3:
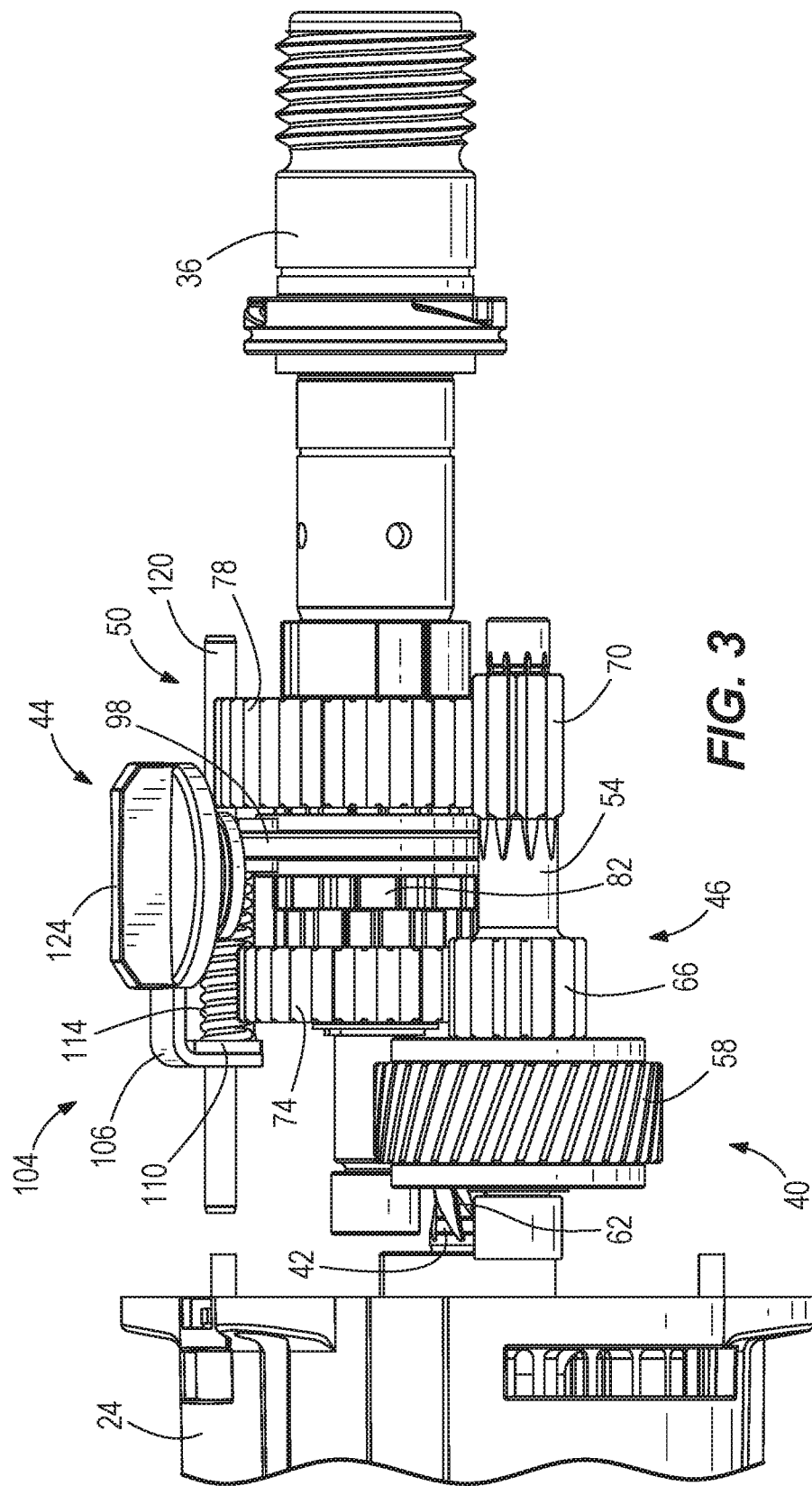
FIG. 3 is a plan view of a drive assembly of the core drill of FIG. 1.

With reference to FIGS. 3 and 4, the illustrated drive assembly 40 includes a multi-speed transmission 44. The transmission 44 includes two gear stages 46, 50 respectively referred to herein as a first gear stage 46 and a second gear stage 50; however, the terms first and second do not imply any spatial or mechanical relationship of the gear stages 46, 50 relative to each other, to the motor 24, or to the spindle 36. In the illustrated embodiment of the transmission 44, the first gear stage 46 includes an intermediate shaft 54 and a helical gear 58 coupled for co-rotation with the intermediate shaft 54. The helical gear 58 may be coupled to the intermediate shaft 54 in any of a number of different ways (e.g., by using a key and keyway arrangement, an interference fit, a spline-fit, etc.). In the illustrated embodiment, the helical gear 58 includes an integrated clutch mechanism (not shown) for limiting the amount of torque transferrable between the motor 24 and the spindle 36. In other embodiments, other clutch mechanisms may be employed at any position along the drive assembly 40. Alternatively, the motor 24 may be provided with an electronic clutch, or the drive assembly 40 may not include a clutch.

The helical gear 58 includes a plurality of teeth meshed with corresponding teeth on a pinion 62 of the motor output shaft 42 for transmitting torque from the output shaft 42 to the intermediate shaft 54. In the illustrated embodiment, the helical gear 58 has a greater number of teeth than the pinion 62 in order to provide a rotational speed reduction and corresponding torque increase from motor output shaft 42 to the intermediate shaft 54. The first gear stage 46 further includes a first driving gear 66 and a second driving gear 70 axially offset from the first driving gear 66. The first and second driving gears 66, 70 may be integrally formed with the intermediate shaft 54 or may be formed separately and coupled to the intermediate shaft 54 for co-rotation therewith in any of a number of different ways.

The second gear stage 50 includes first and second driven gears 74, 78 and a hub 82 supported on the spindle 36 between the driven gears 74, 78. In the illustrated embodiment, the hub 82 is coupled for co-rotation with the spindle 36 using a spline-fit, but the hub 82 may be coupled to the spindle 36 in other ways. The first driven gear 74 and the second driven gear 78 are axially fixed on the spindle 36 (e.g., via one or more snap rings, shoulders, or other inter-engaging features) with the hub 82 acting as a spacer between the two driven gears 74, 78. The spindle 36 extends through a cylindrical bore in each of the respective driven gears 74, 78 such that the driven gears 74, 78 are rotatable relative to the spindle 36.

The first and second driving gears 66, 70 each include external teeth that are continuously meshed with external teeth of respective first and second driven gears 74, 78. In the illustrated embodiment, the first driving gear 66 and the first driven gear 74 are sized to provide a first gear reduction, and the second driving gear 70 and the second driven gear 78 are sized to provide a second gear reduction greater than the first gear reduction. Accordingly, during operation, the first driven gear 74 rotates at a relatively high speed and low torque, and the second driven gear 78 rotates at a relatively low speed and high torque.

Referring to FIG. 4, the hub 82 includes a plurality of axially-extending external splines 86. The first driven gear 74 includes splined portion 90 adjacent the hub 82 that has a corresponding plurality of external splines. Similarly, the second driven gear 78 also includes a splined portion 94 adjacent the hub 82 that has a corresponding plurality of external splines. The transmission 44 further includes a collar 98 having a plurality of internal splines 102 that receive the external splines 86 of the hub 82 to couple the collar 98 for co-rotation with the hub 82. The hub 82, the driven gears 74, 78, and the collar 98 can be made of powdered metal using a suitable process, such as a compaction and sintering process. Alternatively, one or more of the hub 82, the driven gears 74, 78, and the collar 98 can be made of other materials and by other processes, such as machining, die-casting, and the like. As described in further detail below, the collar 98 is shiftable along the spindle 36 to selectively interconnect the splines 86 on the hub with the splined portions 90, 94 of the respective driven gears 74, 78. In the illustrated embodiment, the splines on the driven gears 74, 78 each have a narrower width than the splines 86 on the hub 82. This difference in width provides clearance to facilitate shifting of the collar.

The transmission 44 further includes a shift mechanism 104 operable to move the collar 98 between a first position (not shown), in which the collar 98 engages the splined portion 90 of the first driven gear 74 and the hub 82 to couple the first driven gear 74 and the hub 82 for co-rotation, and a second position (FIG. 3), in which the collar 98 engages the splined portion 94 of the second driven gear 78 and the hub 82 to couple the second driven gear 78 and the hub 82 for co-rotation. In the illustrated embodiment of the transmission 44, the shift mechanism 104 includes a pair of linearly movable, nested brackets 106, 110 for shifting the collar 98 between the first and second positions. A biasing member 114 (e.g., a coil spring) is disposed between the two brackets 106, 110. The brackets 106, 110 and the biasing member 114 are movable together along a rod 120 in response to manual manipulation of an actuator knob 124. The actuator knob 124 includes an eccentric pin (not shown) that is received within a gap 132 between the shift brackets 106, 110 (FIG. 4). As such, rotation of the actuator knob 124 causes linear movement of the brackets 106, 110 (and therefore, the collar 98). Alternatively, the shift mechanism 104 may be configured in any of a number of different ways for displacing the collar 98 between the first and second positions.

In operation, when the transmission 44 is configured in a high speed, low torque mode, the shift mechanism 104 and the collar 98 are shifted to the first position, thereby coupling the first driven gear 74 to the hub 82 for co-rotation. As such, the spindle 36, the hub 82, and the first driven gear 74 all co-rotate together at a relatively high speed. Because the second driven gear 78 is continuously meshed with the second driving gear 98, the second driven gear 78 continues to rotate at a relatively slow speed (i.e., slower than the rotational speed of the spindle 22), and the spindle 36 rotates within the second driven gear 78. When the transmission 44 is configured in a low speed, high torque mode, the shift mechanism 104 and the collar 98 are shifted to the second position (FIG. 3), thereby coupling the second driven gear 78 to the hub 82 for co-rotation. As such, the spindle 22, the hub 82, and the second driven gear 78 all co-rotate together at a relatively low speed. Because the first driven gear 74 remains continuously meshed with the first driving gear 94, the first driven gear 74 continues to rotate at a relatively high speed (i.e., faster than the rotational speed of the spindle 22) and rotates relative to the spindle 22.

To shift the transmission 44 from the high speed, low torque mode to the low speed, high torque mode, a user begins rotating the actuator knob 124. As the actuator knob 124 rotates, the eccentric pin bears against the second bracket 110 which, in turn, pushes against the biasing member 114 to move the first bracket 106 and the collar 98 toward the second position (FIG. 3). The collar 98 then enters a neutral position (not shown), midway between the first position and the second position. In the neutral position, the collar 98 is disengaged from both the first and second driven gears 74, 78 such that no torque is transferred from the driven gears 74, 78 to the hub 82 (and therefore, the spindle 36). If the user continues to rotate the actuator knob 124 and the internal splines 102 of the collar 98 are not yet aligned with the splines of the second driven gear 78, the biasing member 114 is compressed between the brackets 106, 110. Once the respective splines are aligned, the biasing member 114 urges the first bracket 106 and the collar 98 into the second position. Accordingly, the biasing member 114 permits a delay between rotation of the actuator knob 124 and engagement of the collar 98 with the second driven gear 78. Similarly, when shifting the transmission 44 from the low speed, high torque mode to the high speed, low torque mode, the biasing member 114 permits a delay between rotation of the actuator knob 124 and engagement of the collar 98 with the first driven gear 74.

The drive assembly 40 of the core drill 10 advantageously provides for quiet operation. The core drill 10 was tested during no-load operation (i.e. without a tool bit coupled to the spindle 36). Sound pressure data was measured using five microphones surrounding the core drill 10, each positioned at a distance of one meter from the core drill 10. These measurements were then averaged. In the illustrated embodiment, the core drill 10 produces an average sound pressure at a distance of one meter from the drill 10 of 80.0 decibels (dBa) when operating in the high speed, low torque mode. The core drill 10 produces an average sound pressure at a distance of one meter from the drill 10 of 80.4 dBa when operating in the low speed, high torque mode. Thus, regardless of speed, during no-load operation, the core drill 10 produces an average sound pressure less than 81 dBa at a distance of one meter from the drill 10.

Figure 5A:
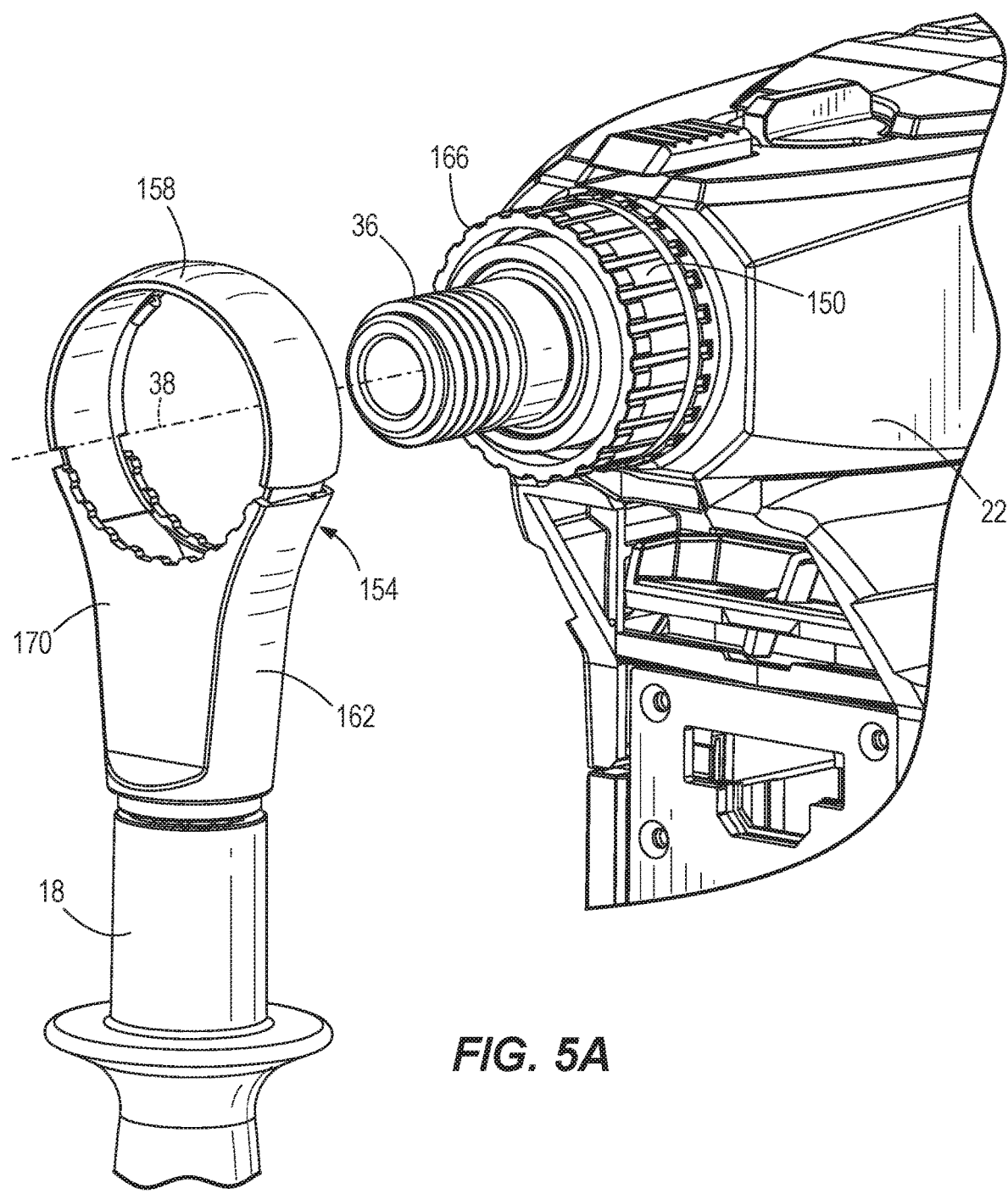
FIG. 5A is a partially exploded view illustrating a band assembly of the core drill of FIG. 1.

With reference to FIG. 5A, the drive housing 22 includes a cylindrical mount 150 extending forward along the spindle 36. A handle holder or band assembly 154 is coupled to the mount 150. In the illustrated embodiment, the band assembly 154 includes an adjustable band 158 and a generally Y-shaped base 162. The auxiliary handle 18 is removably attached to the base 162. The band assembly 154 may be selectively rotatable about the rotational axis 38 of the spindle 36 to allow the auxiliary handle 18 to be positioned in a variety of different orientations. In the illustrated embodiment, the mount 150 includes a plurality of teeth or undulations 166 that are engageable with corresponding teeth or undulations 170 on the base 162 to define a variety of discrete, angular positions of the band assembly 154 (and the auxiliary handle 18).

Figure 5B:
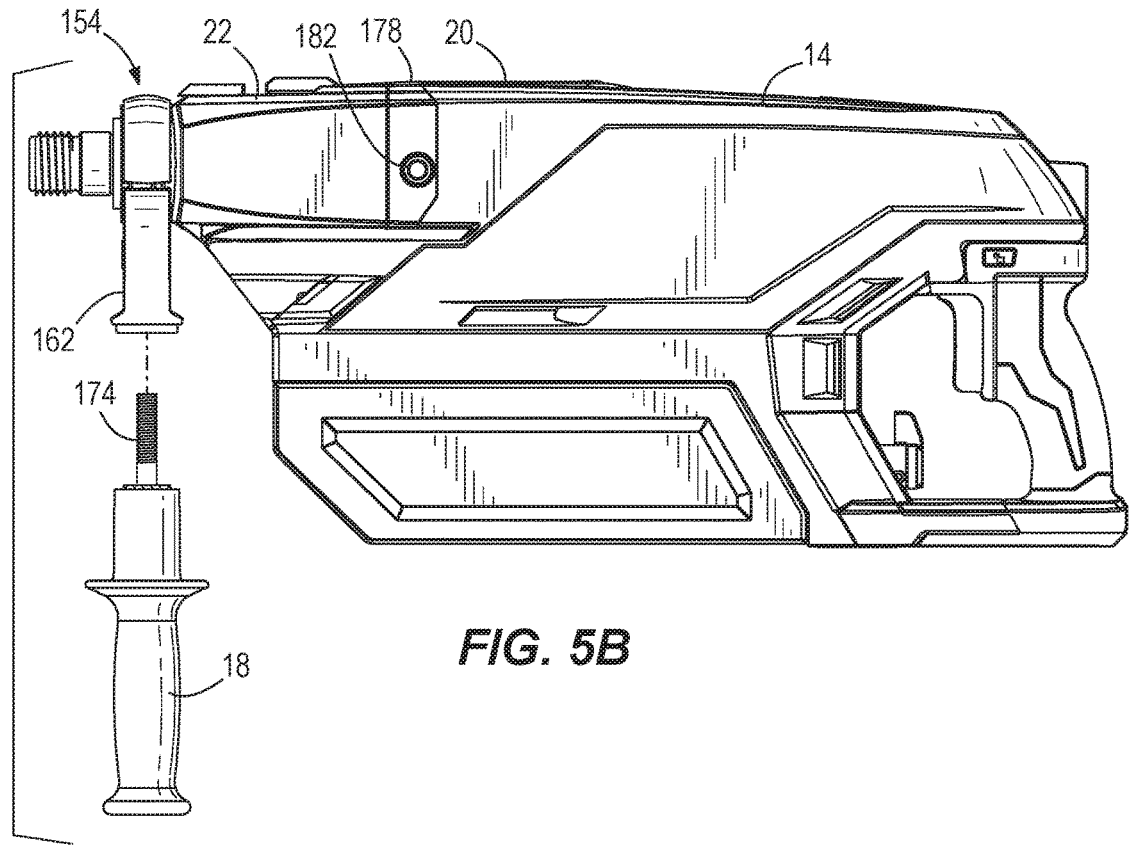
FIG. 5B is a partially exploded view illustrating an auxiliary handle of the core drill of FIG. 1.

With reference to FIG. 5B, the auxiliary handle 18 includes a threaded shank 174 that is received within a threaded bore (not shown) in the underside of the base 162 to removably couple the auxiliary handle 18 to the band assembly 154. In the illustrated embodiment, the housing 14 includes a mounting portion 178 situated between the drive housing 22 and the motor housing portion 20. In some embodiments, the mounting portion 178 may be integrally formed with the drive housing 22, and in other embodiments, the mounting portion 178 may be integrally formed with the motor housing portion 20. Alternatively, the mounting portion 178 can be a separate component assembled together with the housing 14.

Figure 6:
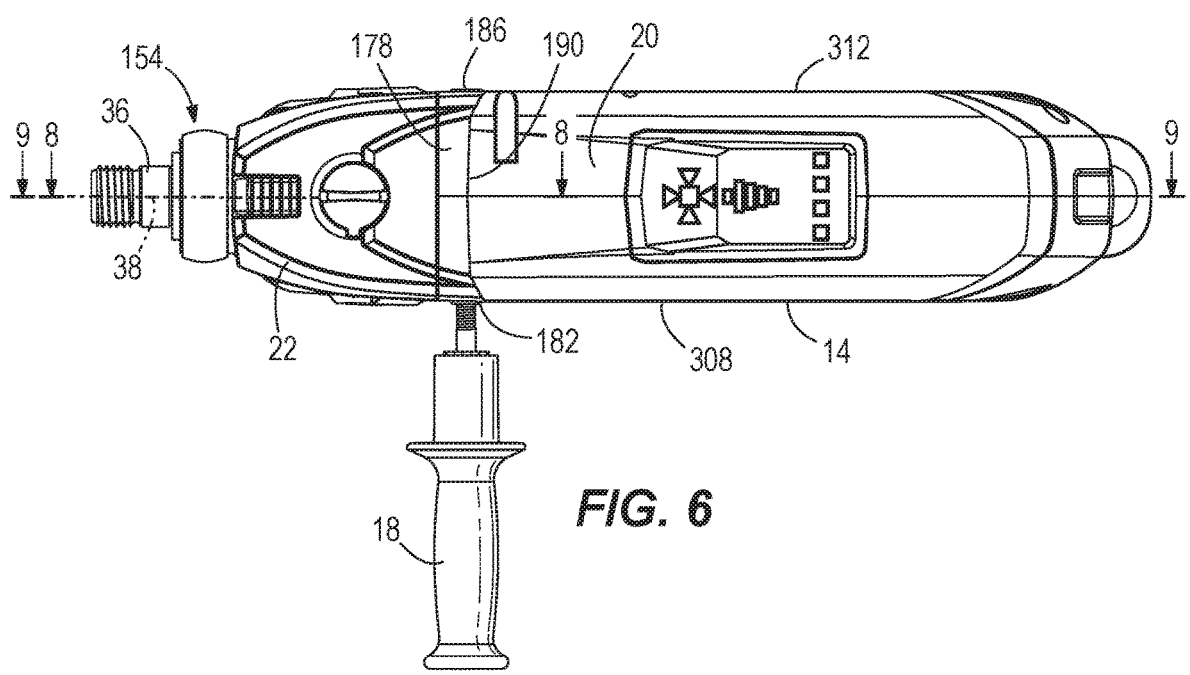
FIG. 6 is a top view of the core drill of FIG. 1 illustrating the auxiliary handle in an alternative position.

Referring also to FIG. 6, the mounting portion 178 includes a first threaded bore 182 (FIG. 5B) and a second threaded bore 186 (FIG. 6) opposite the first threaded bore 182. Each of the bores 182, 186 acts as a mounting point for receiving the threaded shank 174 of the auxiliary handle 18 to directly couple the auxiliary handle 18 to the mounting portion 178. This advantageously provides a variety of different placement options for the auxiliary handle 18. In some embodiments, the core drill 10 may include only one of the first and second bores 182, 186, or may include more than two bores. Alternatively, the bores 182, 186 may be omitted. The illustrated first and second bores 182, 186 extend inwardly from opposite lateral sides of the core drill 10, in a direction generally perpendicular to the rotational axis 38 of the spindle 36. Accordingly, when the auxiliary handle 18 is attached to the first bore 182 or the second bore 186, the auxiliary handle 18 extends outwardly from the left side or the right side of the core drill 10. In other embodiments, one or both of the first and second bores 182, 186 may extend at an oblique angle with the rotational axis 38. In some embodiments, the first and second bores 182, 186 are coaxial and define an axis 190 that intersects the rotational axis 38. In other embodiments, the axis 190 can be offset above or below the rotational axis 38. In yet other embodiments, the first and second bores 182, 186 may not be coaxial. In the illustrated embodiment, the axis 190 is offset from the band assembly 154 along the rotational axis 38 such that the band assembly 154 and the bores 182, 186 provide at least two different mounting locations for the auxiliary handle 18 along the length of the core drill 10.

Figure 7:
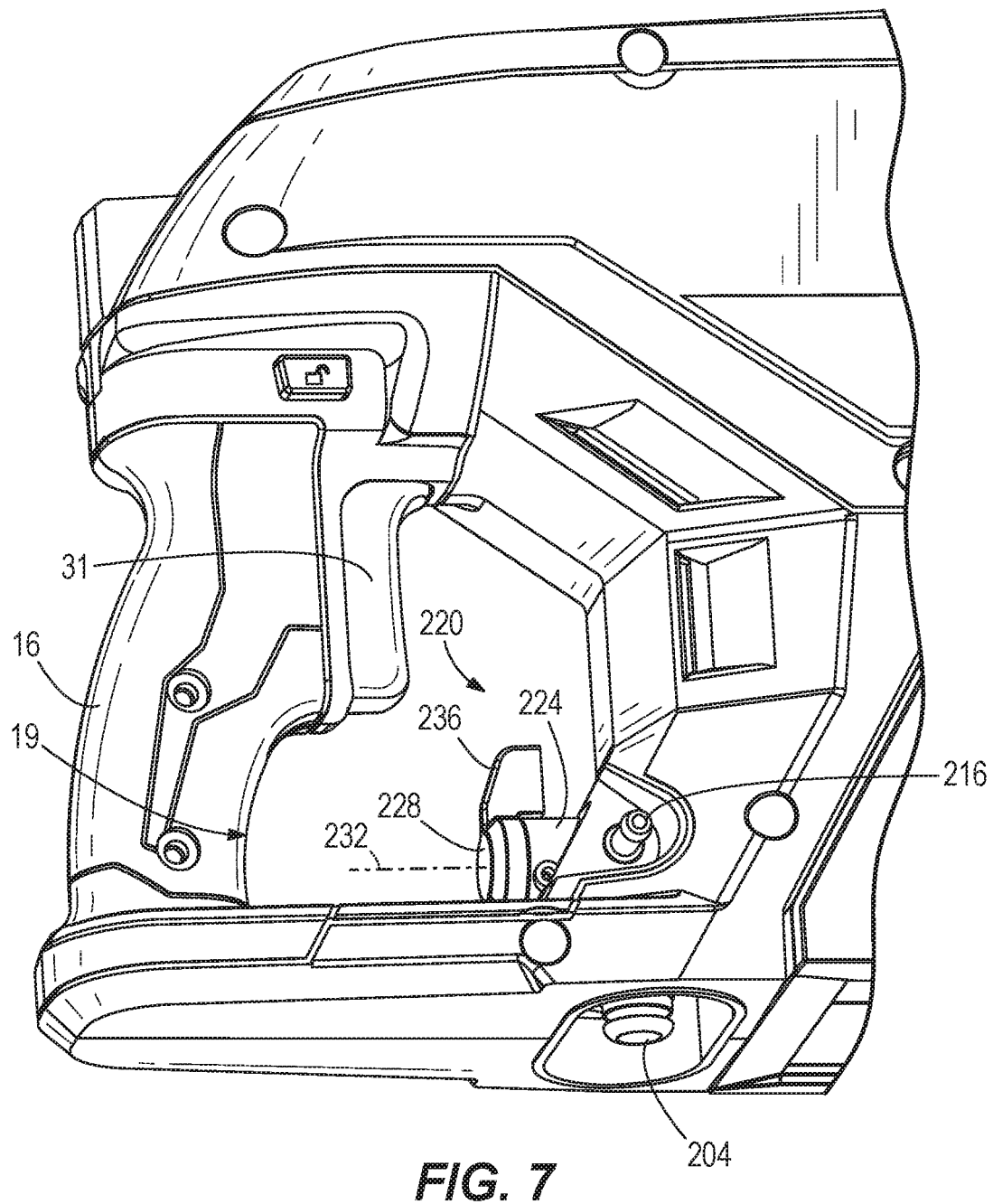
FIG. 7 is a perspective view of a portion of the core drill of FIG. 1.
Figure 8:
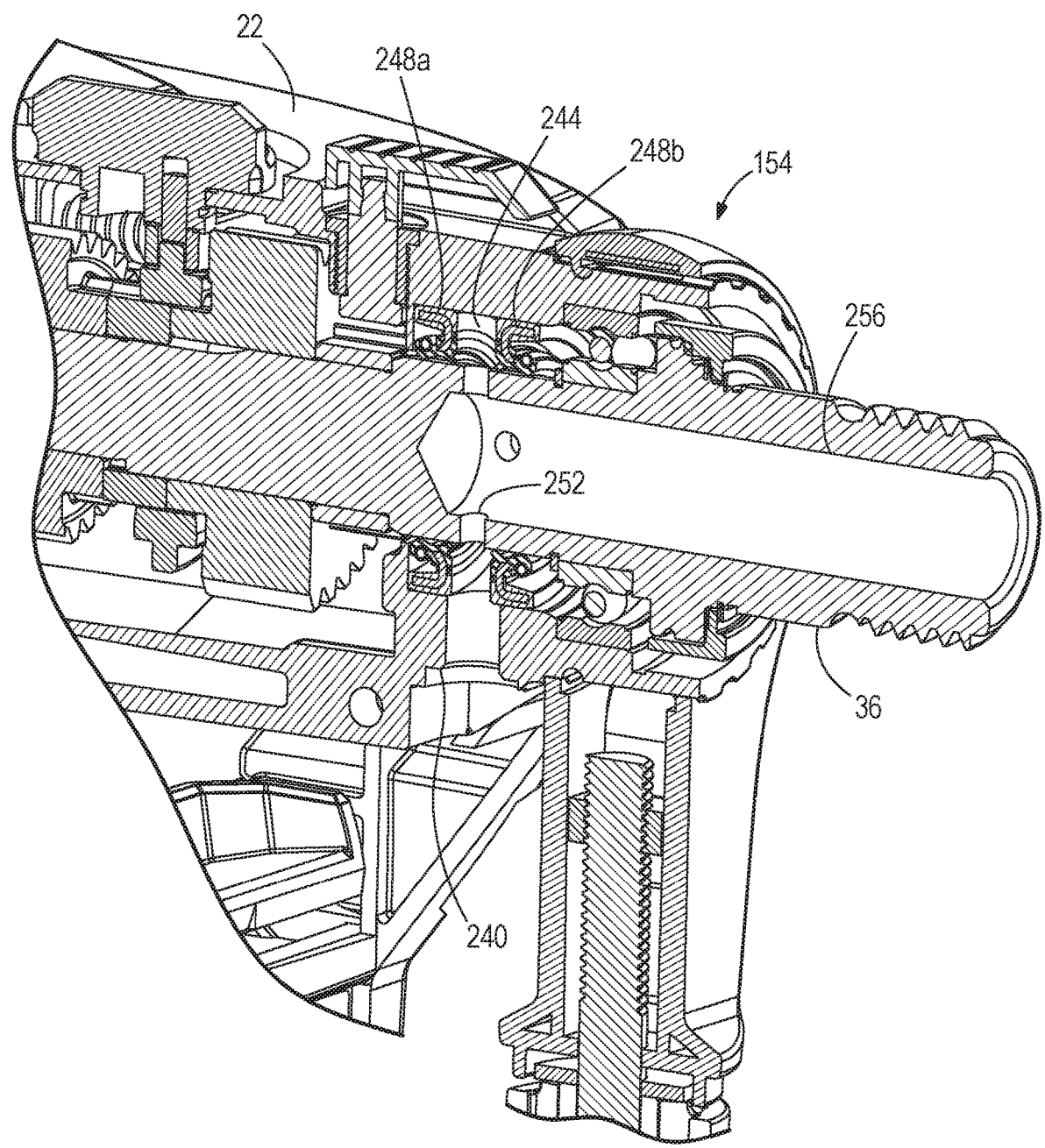
FIG. 8 is a cross-sectional view of a portion of the core drill of FIG. 1.
Figure 9:
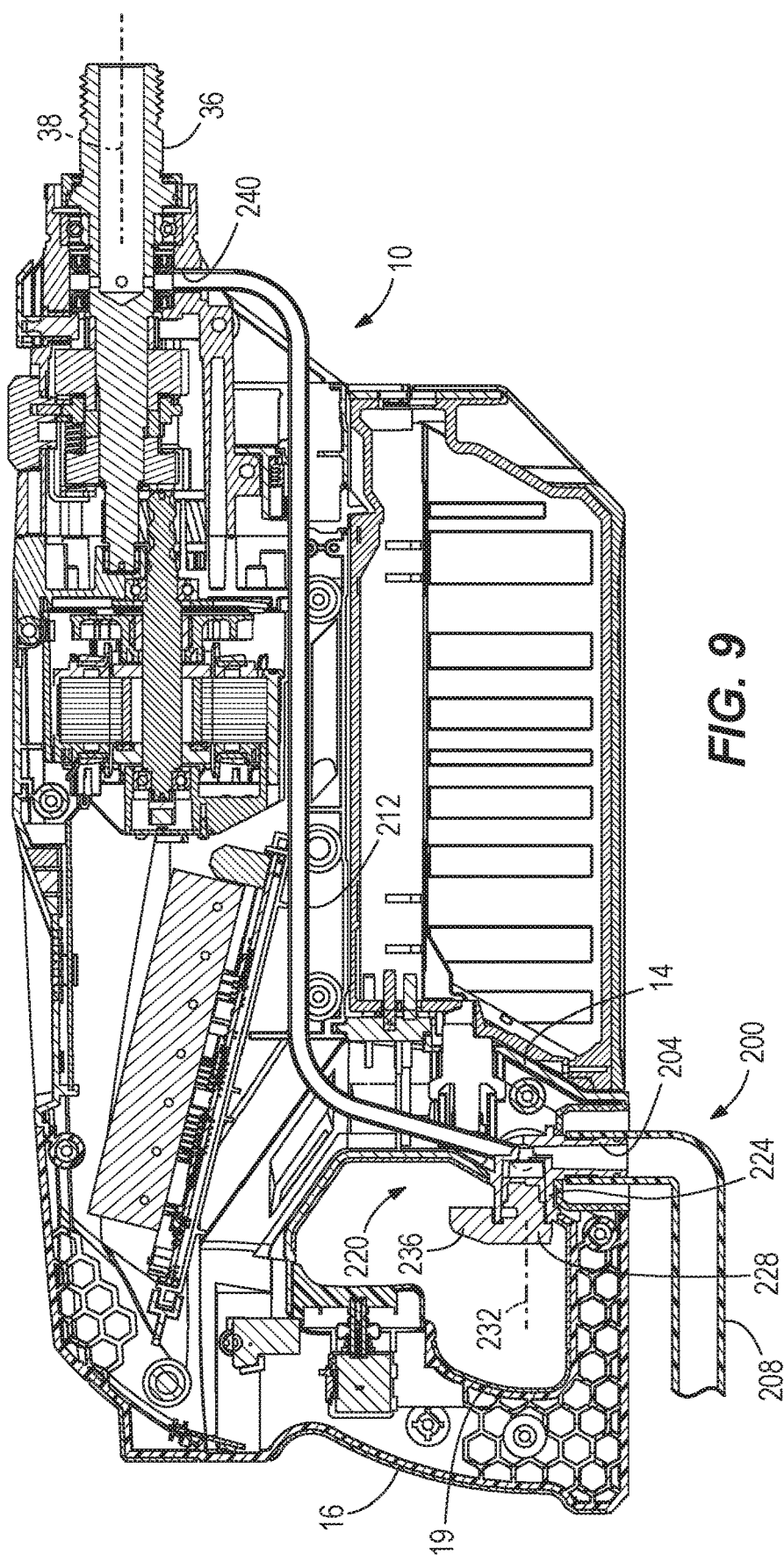
FIG. 9 is a schematic view illustrating a fluid delivery system of the core drill of FIG. 1.

With reference to FIGS. 7-9, the illustrated core drill 10 further includes a fluid distribution system 200. The fluid distribution system 200 includes a first connector 204 and a supply line 208 (FIG. 9) that can be attached to the first connector 204 to provide fluid such as water to the fluid distribution system 200 from an external source (not shown). A delivery line 212 extends from a second connector 216 (FIG. 7) to the spindle 36, and a valve 220 is disposed between the first and second connectors 204, 216 to regulate fluid flow from the supply line 208 to the delivery line 212. The delivery line 212 may extend entirely or partially through the interior of the housing 14, or may extend entirely or partially along the exterior of the housing 14. The illustrated first and second connectors 204, 216 are each barb fittings; however, other suitable types of hose fittings may be used. In the illustrated embodiment, the first and second connectors 204, 216 are recessed into the housing 14 to provide protection for the connectors 204 216.

Referring to FIG. 7, the valve 220 includes a valve housing 224, a valve body 228 that is rotatable relative to the valve housing 224 about an axis 232, and an actuator lever 236 extending from the valve body 228. In other embodiments, the valve 220 may have other components or configurations. The valve 220 is positioned proximate the rear handle 16 and preferably within the gap 19 between the rear handle 16 and the housing 14. As such, a user may grip the rear handle 16, depress the trigger 31, and actuate the valve 220 (by manipulating the actuator lever 236) with the same hand. In the illustrated embodiment, the valve 220 is centered along the width of the core drill 10 such that the axis 232 is coplanar with the rotational axis 38 of the spindle 36. This advantageously allows the user to actuate the valve 220 regardless of which of the user's hands is used to grasp the rear handle 16. In other embodiments, the valve 220 may be positioned off center, proximate the left side or the right side of the core drill 10.

With reference to FIG. 8, the downstream end of the delivery line 212 can be attached to a third connector 240 located on the drive housing 22 adjacent the band assembly 154. The third connector 240 fluidly communicates with an annular volume 244 surrounding the spindle 36. The annular volume 244 is bounded by first and second spaced annular seals 248a, 248b. The spindle 36 includes a plurality of radially extending apertures 252 that fluidly communicate a hollow interior 256 of the spindle 36 with the annular volume 244. As such, fluid that flows through the delivery line 212 and into the annular volume 244 can enter the spindle 36 through the apertures 252. The fluid can then flow through the hollow interior 256 of the spindle 36, and subsequently through a core bit attached to the spindle 36, for cooling, lubrication, and dust abatement.

Figure 10:
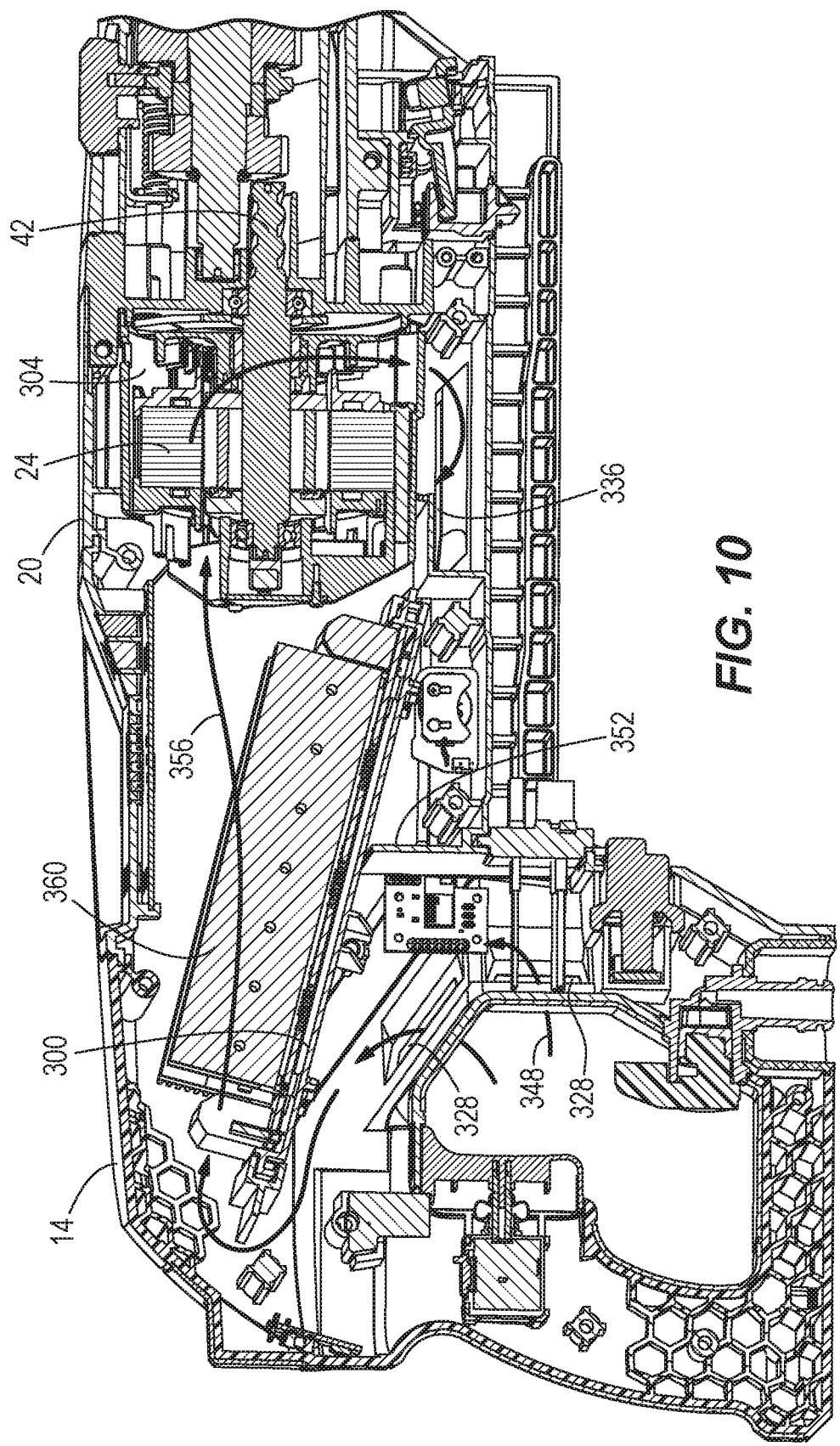
FIG. 10 is a cross-sectional view illustrating a cooling air path of the core drill of FIG. 1.

Referring to FIG. 10, operation of the motor 24 is governed by a motor control system including a printed circuit board ("PCB") 300 that includes power electronics such as switching elements and the like. The illustrated core drill 10 includes a fan 304 coupled to the motor output shaft 42 that generates a cooling airflow through the housing 14 to remove heat from the PCB 300 and/or any other heat-generating components.

The illustrated housing includes left and right side walls 308, 312 (FIG. 6) that extend generally parallel to the rotational axis 38 of the spindle 36, and a rear wall 316 (FIG. 11) that opposes the rear handle 16. Left and right angled walls 320, 324 extend between the respective side walls 308, 312 and the rear wall 316, and the angled walls 320, 324 are oriented inward toward the center of the core drill 10 at an oblique angle. In the illustrated embodiment, the angled walls 320, 324 and the rear wall 316 each include a plurality of segments oriented at different angles; however, in other embodiments, the angled walls 320, 324 and the rear wall 316 may be substantially planar, curved, or include any number of segments or contours.

Figure 11:
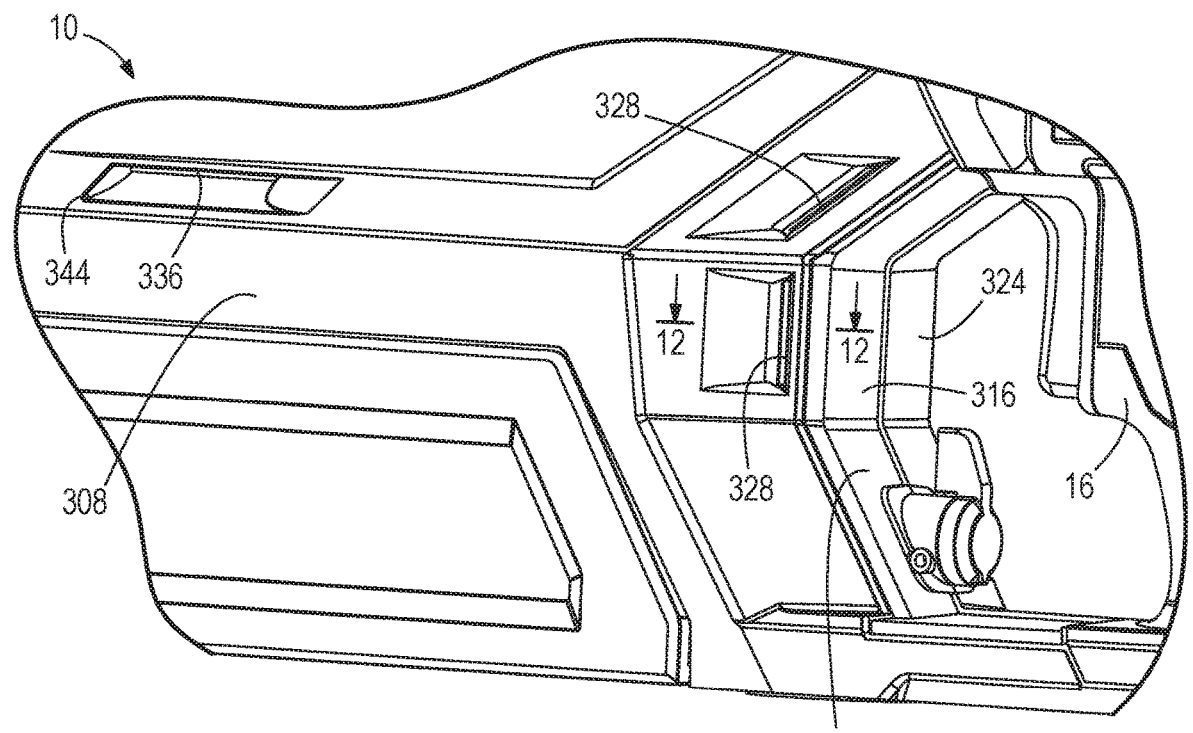
FIG. 11 is a perspective view of a portion of the core drill of FIG. 1.
Figure 12:
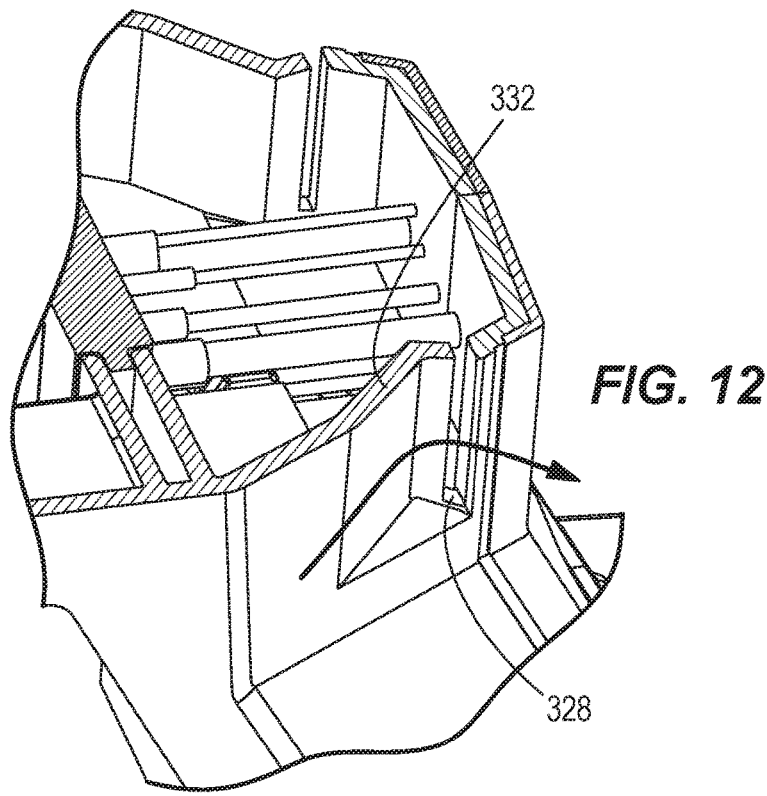
FIG. 12 is a cross-sectional view illustrating an intake opening of the core drill of FIG. 1.

The housing 14 includes a plurality of intake openings 328 located on the angled walls 320, 324 (FIG. 11). The position of the intake openings 328 on the angled walls 320, 324 advantageously helps shield them from fluid spray, dust, and debris that may be present during operation of the core drill 10. In the illustrated embodiment, a deflector 332 is disposed adjacent each of the intake openings 328 to direct fluid away from the openings 328. In other embodiments, the intake openings 328 may be arranged and positioned differently. Additionally, the core drill 10 may draw intake air from other locations.

Figure 13A:
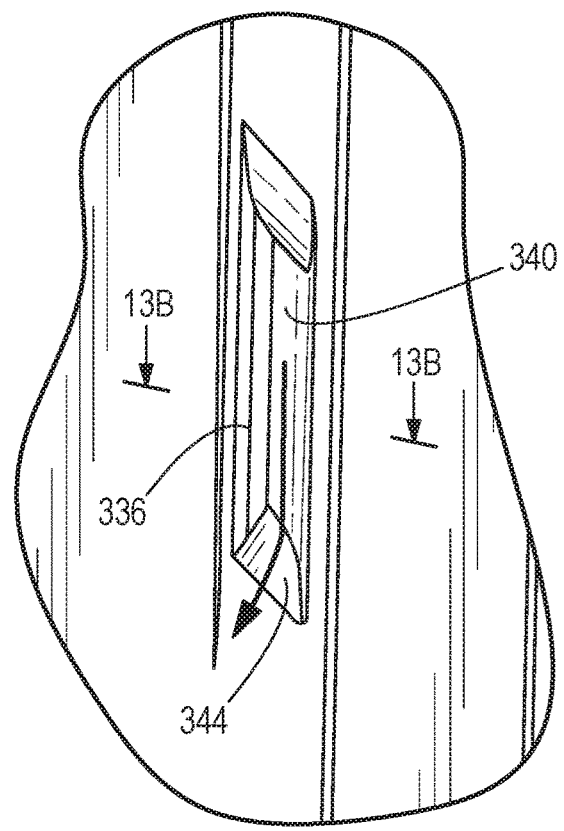
FIG. 13A is a perspective view illustrating an exhaust opening of the core drill of FIG. 1.
Figure 13B:
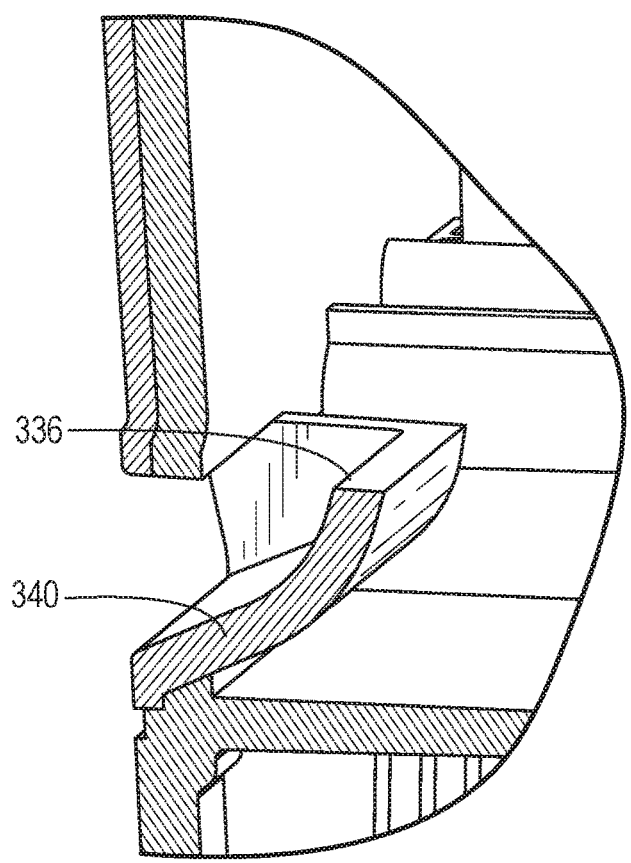
FIG. 13B is a cross-sectional view illustrating the exhaust opening of FIG. 13A.

The housing 14 further includes exhaust openings 336 located on the left and right sides 308, 312 of the housing 14. The exhaust openings 336 open downward with reference to the orientation of the core drill 10 illustrated in FIG. 11 to inhibit fluid, dust, and debris from entering the housing through the exhaust openings 336. A scoop-shaped deflector 340 extends downwardly from the exhaust openings 336 to further inhibit the ingress of fluid, dust and debris. (FIG. 13). The scoop-shaped deflector 340 terminates at an angled surface 344 that is oriented to direct fluid, dust, and debris away from the exhaust openings 336 when the core drill 10 is used in a vertical drilling orientation. In other embodiments, the exhaust openings 336 may be arranged and positioned differently. Additionally, the core drill 10 may exhaust air from other locations.

During operation, the fan 304 draws cooling air into the housing 14 through the intake openings along a cooling air path 348 (FIG. 10). The air drawn through the air intake openings 328 is routed upwardly by a wall 352. Any fluid that enters the housing 14 through the intake openings 328 will fall to the bottom of the housing 14, where it can exit through one or more drain orifices (not shown). The cooling air then flows along a cooling path 356 and over a finned heat sink 360 to cool the PCB 300. After passing over the heat sink 360, the air can enter the motor housing portion 20, cooling the motor 24 before being discharged through the exhaust openings 336.

Figure 14:
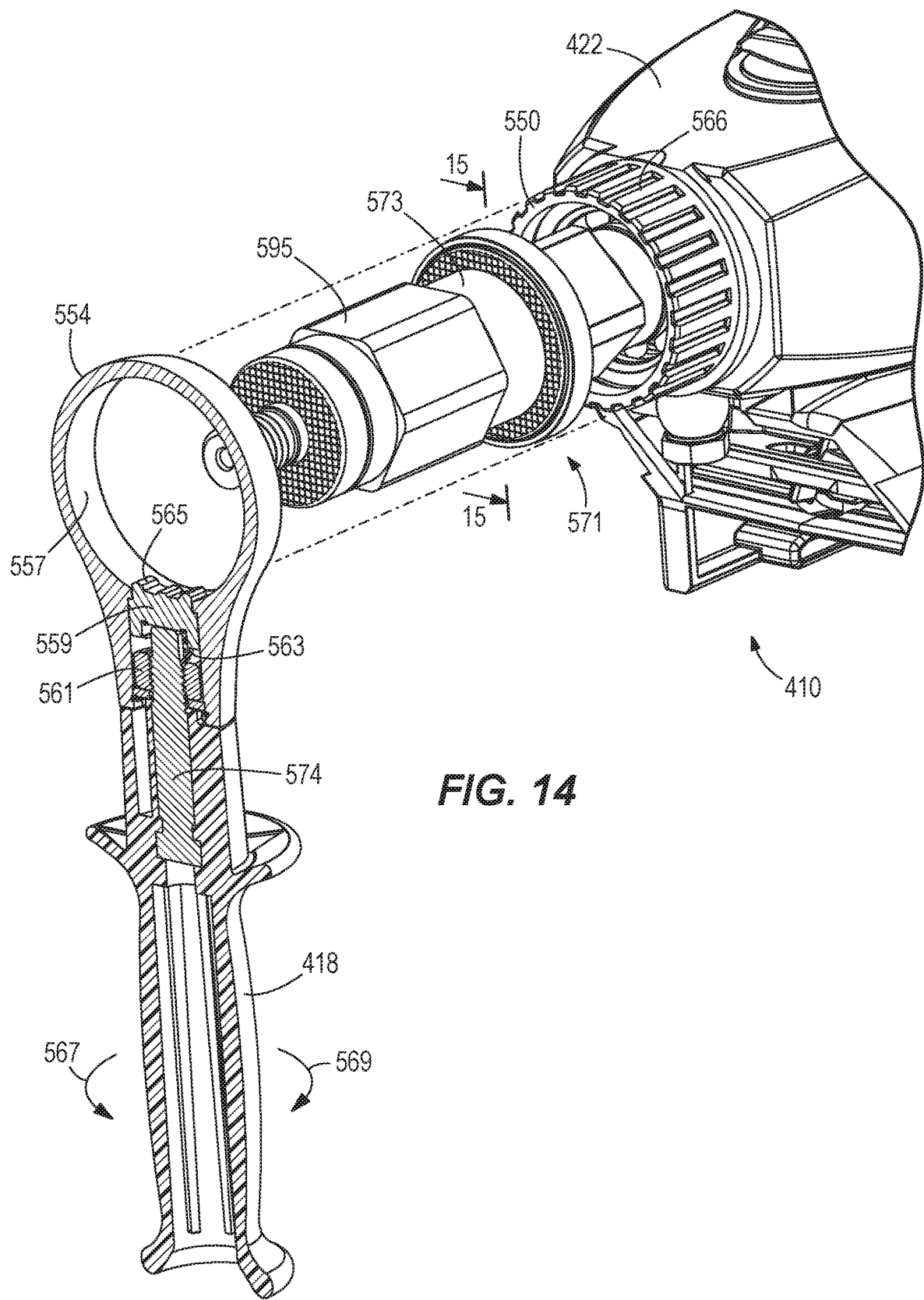
FIG. 14 is an exploded view of a front portion of a core drill in accordance with another embodiment of the invention, illustrating a cross-section of an auxiliary handle of the core drill.

FIGS. 14-15 illustrate portions of a core drill 410 according to another embodiment. The core drill 410 is similar to the core drill 10 described above with reference to FIGS. 1-13B. Accordingly the following description focuses only on differences between the core drill 410 and the core drill 10. In addition, features and elements of the core drill 410 corresponding with features and elements of the core drill 10 are given like reference numbers plus '400'.

Referring to FIG. 14, the core drill 410 includes a drive housing 422 and a handle holder 554 coupled to a mount 550 that extends from a front end of the drive housing 422. The handle holder 554 includes an aperture 557 sized and shaped receive the mount 550 such that the handle holder 554 can be slid onto the mount 550. In the illustrated embodiment, the mount 550 and the aperture 557 are cylindrical, but the mount 550 and the aperture 557 may alternatively define other cooperating shapes.

The handle holder 554 further includes a locking element 559, a nut 561, and a spring 563 disposed between the nut 561 and the locking element 559. The locking element 559 includes teeth 565 that project radially inward from an inner periphery of the aperture 557. The teeth 565 are engageable with corresponding teeth or undulations 566 on the mount 550 to retain the handle holder 554 in a particular rotational position on the mount 550. The locking element 559 is retractable (i.e. displaceable toward the nut 561), against the biasing force of the spring 563, to permit the handle holder 554 to rotate about the mount 550 to different rotational positions.

With continued reference to FIG. 14, the core drill 410 includes an auxiliary handle 418 with a threaded shank 574 that is received within the nut 561 to removably couple the auxiliary handle 418 to the handle holder 554. A distal end of the threaded shank 574 is engageable with the locking element 559 when the auxiliary handle 418 is rotated relative to the handle holder 554 in a tightening direction 567, which prevents the locking element 559 from retracting. The auxiliary handle 418 is thus rotatable in the tightening direction 567 to secure the handle holder 554 (and the auxiliary handle 418) in a particular angular position on the mount 550. In addition, further rotation of the threaded shank 574 in the tightening direction 567 may exert a clamping force the mount 550 via the locking element 559 to axially secure the handle holder 554 and the auxiliary handle 418 on the mount 550.

Conversely, the auxiliary handle 418 is rotatable in a loosening direction 569 opposite the tightening direction 567, which, due to the threaded engagement between the shank 574 and the nut 561, displaces the threaded shank 574 away from the locking element 559. If sufficient force is then applied to the auxiliary handle 418, the engagement between the undulations 566 and the teeth 565 causes the locking element 559 to retract into the handle holder 554 and permit rotation of the handle 418 and handle holder 554 about the mount 550. Further rotation of the auxiliary handle 418 in the loosening direction 569 may decouple the handle 418 from the handle holder 554. An operator may then elect to attach the auxiliary handle 418 to other mounting points on the core drill 410 (such as on the mounting portion 178 described above with reference to FIG. 6).

With reference to FIG. 15, the illustrated core drill 410 includes a bit holder 571 on the spindle 436 and a bit 573 coupled to the bit holder 571. The bit holder 571 includes a threaded end portion 575 of the spindle 436 and a backer flange 577 surrounding the spindle 436. The bit 573 includes internal threads 579 that engage the threaded end portion 575 to couple the bit 573 to the bit holder 571. The backer flange 577 has a front portion 581 and a rear portion 583 engaged against a shoulder 585 formed on the spindle. The rear portion 583 has an axially-extending wall 587 that at least partially surrounds an outer periphery of the front portion 581. In the illustrated embodiment, a thin disc of low-friction material 589, such as Teflon paper, is disposed axially between the front portion 581 and the rear portion 583 of the backer flange 577.

In use, to secure the bit 573 to the bit holder 571, an operator engages the threaded portion 575 of the bit holder 571 with the internal threads 579 on the bit 573, then rotates the bit 573 in a tightening direction 591 to advance the bit 573 toward the backer flange 577. Once a rear end 593 of the bit 573 engages the front portion 581 of the backer flange 577, the operator continues to rotate the bit 573 in the tightening direction 591, which develops an axial force on the flange 577 and a corresponding reaction force on the threads 575, 579. This reaction force increases friction between the threads 575, 579 and inhibits the bit 573 from loosening unintentionally. In the illustrated embodiment, the bit 573 includes flats 595 that allow the operator to apply additional torque on the bit 573 in the tightening direction 591 using a wrench, for example.

To loosen the bit 573, the operator rotates the bit 573 in a loosening direction 597. The disc of low friction material 589 between the front portion 581 and the rear portion 583 of the backer flange 577 allows the front portion 581 to rotate relative to the rear portion 583 more easily under the axial load applied on the front portion 581 by the bit 573. As such, the rear end 593 of the bit 573 does not bind on the backer flange 577, which facilitates removal of the bit 573.

With continued reference to FIG. 15, in the illustrated embodiment, the bit 573 is an adapter bit. As such, the bit 573 includes a second bit holder 599 having a front threaded portion 601. The front threaded portion 601 of the second bit holder 599 has a different (e.g., smaller) diameter than the threaded portion 575 of the bit holder 571. Thus, the core drill 410 is adaptable for use with different tool bits using a single spindle 436. For example, the threaded portion 575 of the bit holder 571 may be sized to receive a wet core bit (not shown) intended for use with a fluid distribution system of the core drill 410 (e.g., the fluid distribution system 200). The wet core bit may be attached to the bit holder 571 in the same manner as the adapter bit 573 described above. The front threaded portion 601 of the second bit holder 599 may be sized to receive a dry core bit (not shown) intended for use without operating the fluid distribution system.

Like the bit holder 571, the second bit holder 599 includes a backer flange 603. The backer flange 603 is coupled to the adapter bit 573 by a retaining ring 605. A thin disc of low-friction material 607, such as Teflon paper, is disposed axially between the backer flange 603 and a shoulder 608 formed at a base of the front threaded portion 601.

In use, to secure a bit (e.g., the dry core bit) to the spindle 436 via the second bit holder 599, an operator engages the front threaded portion 601 with internal threads on the bit, then rotates the bit in a tightening direction 591 to advance the bit toward the backer flange 603. Once a rear end of the bit engages a front side 609 of the backer flange 603, the operator continues to rotate the bit in the tightening direction 591, which develops an axial force on the flange 603 and a corresponding reaction force on the threads 601. This reaction force increases friction between the threads 601 and the bit, and inhibits the bit from loosening unintentionally. To loosen the bit, the operator rotates the bit in the loosening direction 597. The disc of low friction material 607 between the backer flange 603 and the shoulder 608 allows the backer flange 603 to rotate relative to the remainder of the adapter bit 573 more easily under the axial load applied on the front side 609 by the bit. As such, the rear end of the bit does not bind on the backer flange 603, which facilitates removal of the bit.

Various features of the invention are set forth in the following claims.

What is claimed is:

1. A power tool, comprising:
a housing including a motor housing portion, a drive housing, and a mounting portion between the motor housing portion and the drive housing;
a motor located within the motor housing portion;
a spindle configured to rotate about a rotational axis in response to torque received from the motor;
a handle holder coupled to the drive housing, the handle holder defining a first mounting point, and the mounting portion defining a second mounting point; and
an auxiliary handle selectively attachable to each of the first and second mounting points,
wherein the first mounting point is located at a first position along the rotational axis, and the second mounting point is located at a second position offset from the first position in a direction along the rotational axis.

2. The power tool of claim 1, wherein the auxiliary handle includes a threaded shank, and wherein each of the first and second mounting points includes a threaded bore configured to receive the threaded shank.

3. The power tool of claim 1, wherein the handle holder is selectively rotatable relative to the drive housing about the rotational axis between a plurality of rotational positions.

4. The power tool of claim 3, wherein the handle holder includes a tooth.

5. The power tool of claim 4, wherein the tooth is engageable with a plurality of teeth on the housing to retain the handle holder in the plurality of rotational positions.

6. The power tool of claim 1, wherein the mounting portion defines a third mounting point, and wherein the auxiliary handle is selectively attachable to the third mounting point.

7. The power tool of claim 6, wherein the third mounting point and the second mounting point are positioned on opposite sides of the rotational axis.

8. The power tool of claim 6, wherein the auxiliary handle includes a threaded shank, and wherein each of the first, second, and third mounting points includes a threaded bore configured to receive the threaded shank.

9. The power tool of claim 8, wherein the threaded bore of the second mounting point and the threaded bore of the third mounting point extend inwardly from opposite sides of the mounting portion.

10. A power tool, comprising:
a housing including a motor housing portion, a drive housing, and a mounting portion between the motor housing portion and the drive housing;
a motor located within the motor housing portion;
a spindle configured to rotate about a rotational axis in response to torque received from the motor;
a transmission at least partially disposed within the drive housing, the transmission configured to transmit torque from the motor to the spindle; and
an auxiliary handle selectively attachable to the housing at each of a first mounting point, a second mounting point, and a third mounting point,
wherein at least one of a group consisting of the first mounting point, the second mounting point, and the third mounting point is located on the mounting portion, and
wherein the first mounting point is located at a first position along the rotational axis, the second mounting point is located at a second position offset from the first position in a direction along the rotational axis, and the third mounting point is located at a third position offset from at least one of the first position or the second position in the direction along the rotational axis.

11. The power tool of claim 10, wherein the auxiliary handle includes a threaded shank, and wherein each of the first, second, and third mounting points includes a threaded bore configured to receive the threaded shank.

12. The power tool of claim 11, wherein the threaded bore of the second mounting point and the threaded bore of the third mounting point extend inwardly from opposite sides of the mounting portion.

13. The power tool of claim 10, further comprising a handle holder coupled to the drive housing, the handle holder defining the first mounting point.

14. The power tool of claim 10, wherein the third mounting point is located at a third position offset from the first position in the direction along the rotational axis.

15. The power tool of claim 10, wherein the first mounting point is selectively rotatable about the rotational axis relative to the housing.

16. A power tool, comprising:
a housing including a motor housing portion and a mount;
a motor located within the motor housing portion;
a spindle configured to rotate about a rotational axis in response to torque received from the motor;
a handle holder selectively securable to the mount in a plurality of different rotational orientations about the rotational axis, wherein the handle holder includes a first mounting point, and the housing includes a second mounting point; and
an auxiliary handle selectively attachable to each of the first mounting point and the second mounting point.

17. The power tool of claim 16, wherein the first mounting point is located at a first position along the rotational axis, and the second mounting point is located at a second position offset from the first position in a direction along the rotational axis.

18. The power tool of claim 16, wherein the auxiliary handle is rotatable in a loosening direction to permit adjustment of the handle holder between the plurality of rotational orientations, and wherein the auxiliary handle is rotatable in a tightening direction to secure the handle holder in a selected one of the plurality of rotational orientations.

19. The power tool of claim 18, wherein the auxiliary handle includes a threaded shank, wherein the handle holder includes a locking element, and wherein rotation of the auxiliary handle in the tightening direction engages the threaded shank against the locking element.

20. The power tool of claim 19, wherein the locking element is biased into engagement with the mount.

\* \* \* \* \*